(12) United States Patent
Nakamura

(10) Patent No.: US 11,506,457 B2
(45) Date of Patent: Nov. 22, 2022

(54) HEADER PLATELESS TYPE HEAT EXCHANGER

(71) Applicant: T.RAD Co., Ltd., Tokyo (JP)

(72) Inventor: Yoichi Nakamura, Tokyo (JP)

(73) Assignee: T.RAD CO., LTD., Tokyo (JP)

( * ) Notice: Subject to any disclaimer, the term of this patent is extended or adjusted under 35 U.S.C. 154(b) by 0 days.

(21) Appl. No.: 16/954,941

(22) PCT Filed: Dec. 17, 2018

(86) PCT No.: PCT/JP2018/047420
§ 371 (c)(1),
(2) Date: Jun. 17, 2020

(87) PCT Pub. No.: WO2019/131571
PCT Pub. Date: Jul. 4, 2019

(65) Prior Publication Data
US 2020/0333080 A1  Oct. 22, 2020

(30) Foreign Application Priority Data
Dec. 27, 2017 (JP) .............................. JP2017-251881

(51) Int. Cl.
*F28D 9/00* (2006.01)
*F28F 3/08* (2006.01)
*F28F 9/02* (2006.01)
*F28D 7/16* (2006.01)

(52) U.S. Cl.
CPC ......... *F28D 9/0093* (2013.01); *F28D 7/1684* (2013.01); *F28F 3/086* (2013.01); *F28F 9/0221* (2013.01)

(58) Field of Classification Search
CPC .......... F28F 1/025; F28F 1/04; F28F 21/0003; F28F 3/042; F28F 9/182; F28F 9/0221; F28F 1/06; F28F 2265/26; F28D 7/1684; F28D 7/163; F28D 9/0031; F28D 9/0037; F28D 21/0003; F28D 1/0535; F28D 9/0219; F28D 9/0221
See application file for complete search history.

(56) References Cited

U.S. PATENT DOCUMENTS

| | | | |
|---|---|---|---|
| 3,039,744 A * | 6/1962 | Jacobs | F28F 9/18 165/83 |
| 2005/0144978 A1 | 7/2005 | Papapanu | |
| 2006/0219394 A1 | 10/2006 | Martin | |
| 2007/0193732 A1 * | 8/2007 | Oofune | F28D 9/0031 165/164 |

(Continued)

FOREIGN PATENT DOCUMENTS

| | | | |
|---|---|---|---|
| DE | 1064538 B * | 9/1959 | ............. F28F 9/013 |
| JP | 2004-028469 A | 1/2004 | |

(Continued)

*Primary Examiner* — Jianying C Atkisson
*Assistant Examiner* — For K Ling
(74) *Attorney, Agent, or Firm* — Norris McLaughlin, P.A.

(57) ABSTRACT

In a header plateless type heat exchanger, to suppress temperature rise at an apical portion of a tube into which exhaust gas at high temperatures or the like flows, to thereby improve durability. A recessed groove portion 4c recessed inward with narrow width is formed on outer face side of each of a pair of plates, in parallel to a swelling portion 4 and in the approximately same length.

2 Claims, 5 Drawing Sheets

(56) References Cited

U.S. PATENT DOCUMENTS

| | | | |
|---|---|---|---|
| 2008/0011456 A1* | 1/2008 | Meshenky | F28F 9/14 165/83 |
| 2010/0319889 A1* | 12/2010 | Ikeda | F28F 1/025 165/157 |
| 2011/0000657 A1* | 1/2011 | Ruckwied | F28F 1/42 165/181 |
| 2014/0060504 A1* | 3/2014 | Collins | F02M 26/32 29/890.03 |
| 2014/0299115 A1* | 10/2014 | Zhang | F28D 21/0003 123/568.12 |
| 2016/0223272 A1* | 8/2016 | Nakamura | F28F 9/0221 |
| 2017/0016684 A1 | 1/2017 | Okubo et al. | |
| 2018/0320975 A1 | 11/2018 | Shiozawa et al. | |

FOREIGN PATENT DOCUMENTS

| | | |
|---|---|---|
| JP | 2007-225190 A | 9/2007 |
| JP | 2013-096632 A | 5/2013 |
| JP | 2015-194324 A | 11/2015 |
| JP | 2015194324 A * | 11/2015 |
| JP | 2016-183833 A | 10/2016 |
| WO | 2017/073779 A1 | 5/2017 |

\* cited by examiner

HEADER PLATELESS TYPE HEAT EXCHANGER

TECHNICAL FIELD

The present invention relates to a heat exchanger having a core of a header plateless type, which is optimal for EGR coolers in which mainly exhaust gas is cooled with cooling water, or exhaust heat recovery devices in which heat of exhaust gas is recovered in cooling water.

In a core of this header plateless type, flat tubes whose open ends are swelled in a thickness direction are used and stacked at the swelling portion to make a header plate needless.

BACKGROUND ART

In Patent Literature 1 below, a header plateless type heat exchanger has been proposed.

In this heat exchanger core 15a, as shown in FIGS. 5, 6 and 7, a flat tube 16a that forms the core is composed by fitting a pair of plates formed in a groove shape so that respective bottoms of grooves face each other, swelling portions 16b are formed at both ends on open sides, stacking is performed at the swelling portions 16b, and respective plates are brazed and fixed integrally. Further, as shown in FIG. 6, a crossing angle θ between respective plates is formed in an acute angle.

CITATION LIST

Patent Literature

PTL 1: Japanese Patent Laid-Open No. 2016-183833

SUMMARY OF INVENTION

Technical Problem

In the conventional header plateless type heat exchanger, there is such a risk that temperatures in respective flat tubes become high at an inlet portion of exhaust gas to deteriorate the heat exchanger due to a heat cycle that is generated repeatedly.

This is due to the fact that a header plateless type heat exchanger has such a disadvantage, although it results in an advantage of a simple structure, which cooling performance at the apical portion of respective flat tubes is worse as compared with a heat exchanger with a header plate and the portion reaches a high temperature.

Thus, this invention is directed to provide a heat exchanger that can descend as far as possible the temperature at an apical portion of a flat tube, while having the advantage of header plateless.

Solution to Problem

The present invention according to claim 1 is a header plateless type heat exchanger, the heat exchanger having a flat tube 7 that has a pair of plates 5, 6 each including a pair of side walls 1 on both sides raised up to be formed in a groove-like shape wholly and swelling portions 4 with narrow width formed outside in a thickness direction at edges on both open sides of a groove bottom 3 orthogonal to the side wall 1, and these plates 5, 6 fitted while facing each other in an opposite direction; and a heat exchanger core 15 in which plural flat tubes 7 are stacked each other at swelling portions 4 and respective plates 5, 6 are brazed and joined each other, in which a first fluid 10 flows from each front edge of the swelling portions 4 of flat tubes 7 into the inside thereof, and a second fluid 11 circulates on the outside thereof, wherein a recessed groove portion 4c that is recessed inward with narrow width is formed on an outer face side of each of plates 5, 6, in parallel to the swelling portion 4 and in the approximately same length, and a projecting part that is inverse to the same is formed on an inner face side thereof.

The present invention according to claim 2 is the header plateless type heat exchanger according to claim 1, wherein each width of the swelling portions 4 of the respective plates 5, 6 is formed so as to be width wide portions 4b with wide width at both end portions in a longitudinal direction of the swelling portions 4 and to be width narrow portions 4a with narrow width in intermediate portions other than those, and, at the both end portions, the brazed and joined portions in a flat triangle or a curved plane, whose portion lying nearer to the side wall 1 is wider, are included.

Advantageous Effects of Invention

The present invention according to claim 1 is one in which the recessed groove portion 4c recessed inward with narrow width is formed on the outer face side of each of plates 5, 6, in parallel to the swelling portion 4 and in the approximately same length. Accordingly, a flow rate of cooling water flowing through the vicinity of the swelling portion 4, that is, the recessed groove portion 4c, increases.

Moreover, in contrast to the fact that the crossing angle θ on the outer face side of the stacked portion in the flat tube 16a of a conventional type shown in FIG. 6 is formed in an acute angle, in the instance of the flat tube 7 of the present invention, expansion resulted from the formation of the recessed groove portion 4c also causes increase in the flow rate of cooling water in the vicinity of the swelling portion 4. From these results, cooling of an apical portion of the flat tube 7 is promoted and temperature rise in the apical portion is suppressed to prevent degradation of the heat exchanger due to a heat cycle.

Furthermore, since the recessed groove portion 4c functions as a reinforcing rib against bending in the longitudinal direction of the swelling portion 4, it becomes capable to reduce the width of the swelling portion 4 and, as the result, distance from the cooling water to the front edge of the flat tube 7 becomes shorter. This also promotes cooling of the apical portion and suppresses temperature rise at the apical portion, and therefore degradation of the heat exchanger due to a heat cycle is prevented.

Moreover, the recessed groove portion 4c functions as a component of elastic deformation for expansion and contraction in an axis direction of the flat tube 7 to absorb difference in thermal expansion in the direction, and therefore degradation of the heat exchanger due to a heat cycle is also prevented.

In the present invention according to claim 2, the width wide portion 4b, which is wider, is formed at each of both end portions in the longitudinal direction of the swelling portion 4, and the width narrow portion 4a, which is narrower, is formed in the intermediate portion other than these. Therefore, a cooling effect is improved in sites with large temperature rise due to exhaust gas (intermediate portions in the longitudinal direction of the swelling portion 4).

Furthermore, the width wide portion 4b of the swelling portion 4 is formed in a flat triangle or in a curved plane whose portion lying nearer to side walls 1, 2 is wider. Consequently, concentration of thermal stress near a side wall is released so as to additionally prevent degradation of the heat exchanger due to a heat cycle.

BRIEF DESCRIPTION OF DRAWINGS

FIG. 5 is a principal part plan view of a conventional type flat tube 16a.

DESCRIPTION OF EMBODIMENTS

Next, embodiments of the present invention will be explained on the basis of drawings.

The heat exchanger of the present invention is optimal mainly as an EGR cooler. In this explanation of the embodiments, exhaust gas corresponds to a first fluid 10, and cooling water corresponds to a second fluid 11.

Figure 4:
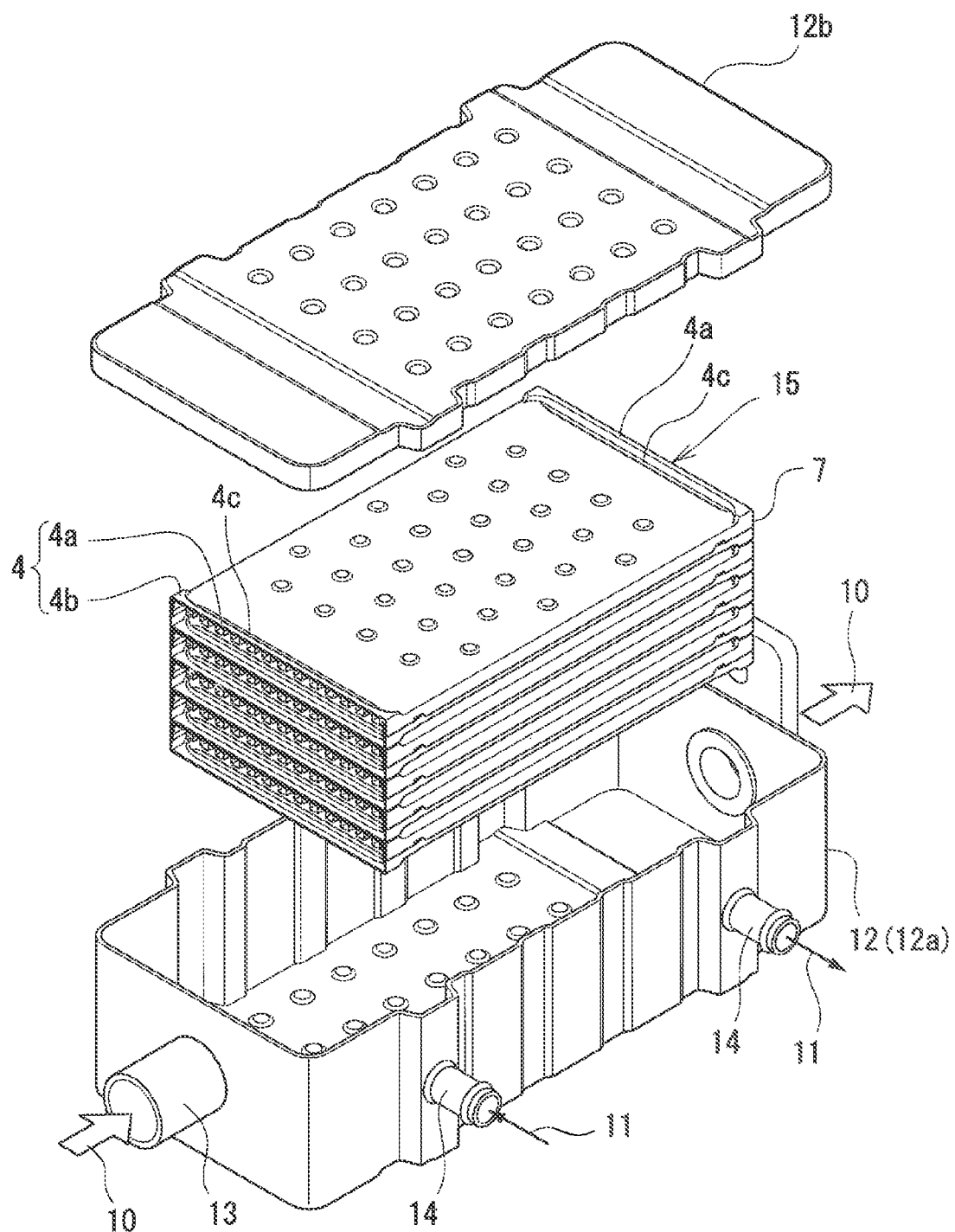
FIG. 4 is an exploded perspective view of a heat exchanger having the heat exchanger core 15.
Figure 5:
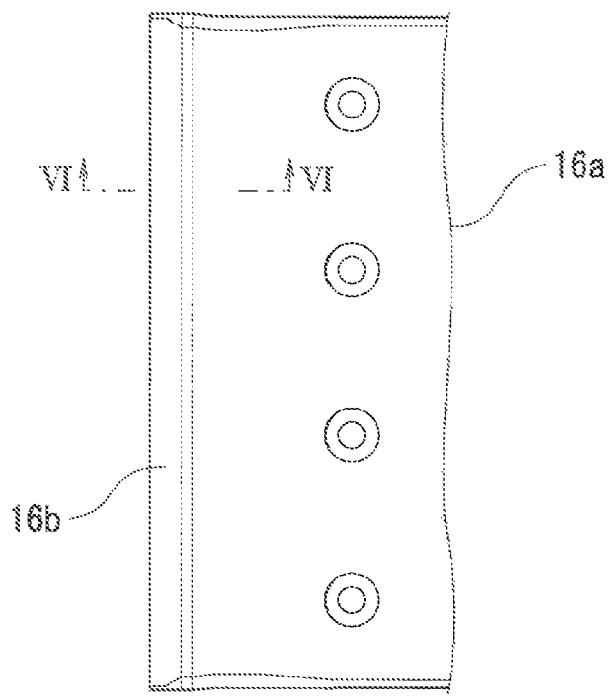
Figure 6:
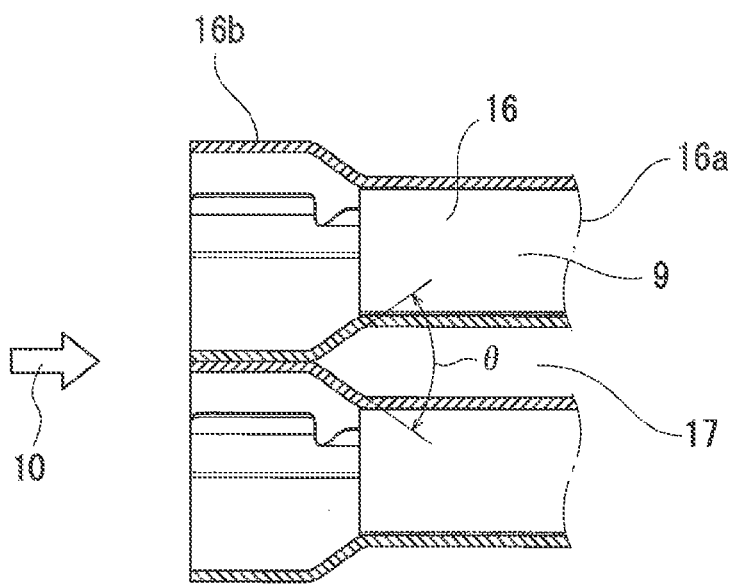
FIG. 6 is a principal part vertical cross-sectional view of a core composed of a stacked body of the flat tubes 16a, and is a arrow-seen cross-sectional view in FIG. 5.
Figure 7A:
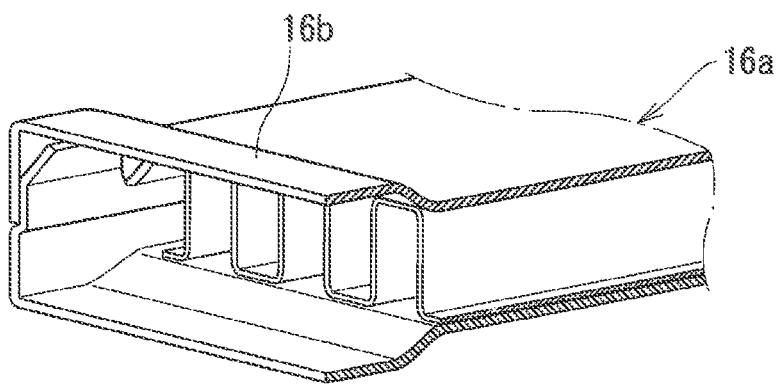
FIGS. 7A and 7B show a principal part perspective view of the flat tube 16a (FIG. 7A), and a principal part vertical section perspective view of a heat exchanger core 15a composed of a stacked body of the flat tubes 16a (FIG. 7B).
Figure 7B:
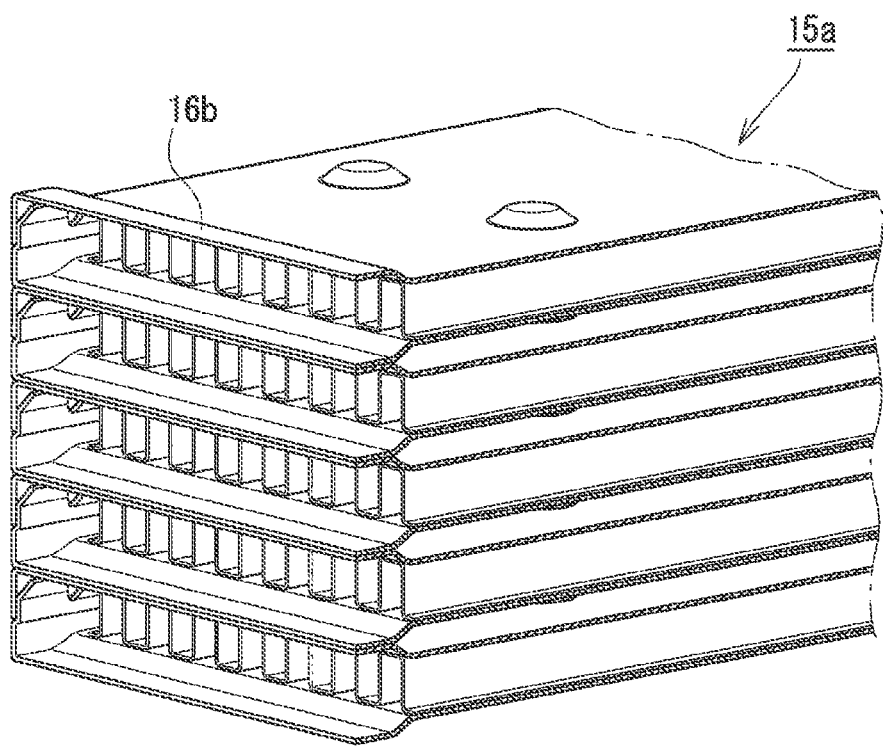

In this heat exchanger, as shown in FIG. 4, many flat tubes 7 are stacked to form a heat exchanger core 15, and the outer circumference of the heat exchanger core 15 is fitted with a casing 12. Then, the exhaust gas (first fluid) 10 is circulated on the inner face side of respective flat tubes 7, and the cooling water (second fluid) 11 is circulated on the outer face side thereof.

As shown in FIGS. 1, 2, 3A and 3B, each of the flat tubes 7 forming the heat exchanger core 15 is composed of one in which a pair of plate 5, plate 6, each of which has a pair of side walls 1 raised at both ends to be formed in a groove-like shape as a whole, are fitted facing each other in the opposite direction.

At each of edges on both open sides (sides on which open ends of the flat tube 7 are formed) of respective plate 5, plate 6, a swelling portion 4 with narrow width is formed outward in the thickness direction.

Moreover, an inner fin 9 is inserted in the inside of each flat tube 7.

At least one side of each of parts to be joined each other is preferably covered or coated with a brazing material.

Meanwhile, the casing 12 is formed of a casing main body 12a in a box shape and a lid 12b. In addition, a pair of pipes 13 for the exhaust gas (first fluid) 10 are arranged on both ends in the longitudinal direction of the casing 12, and a pipe 14 for the cooling water (second fluid) 11 is arranged to the casing 12 so that cooling water is circulated through a water channel 17 of the heat exchanger core 15. Then, respective parts are brazed integrally in a furnace at high temperatures to form a heat exchanger.

(Characteristics of Invention)

Figure 1:
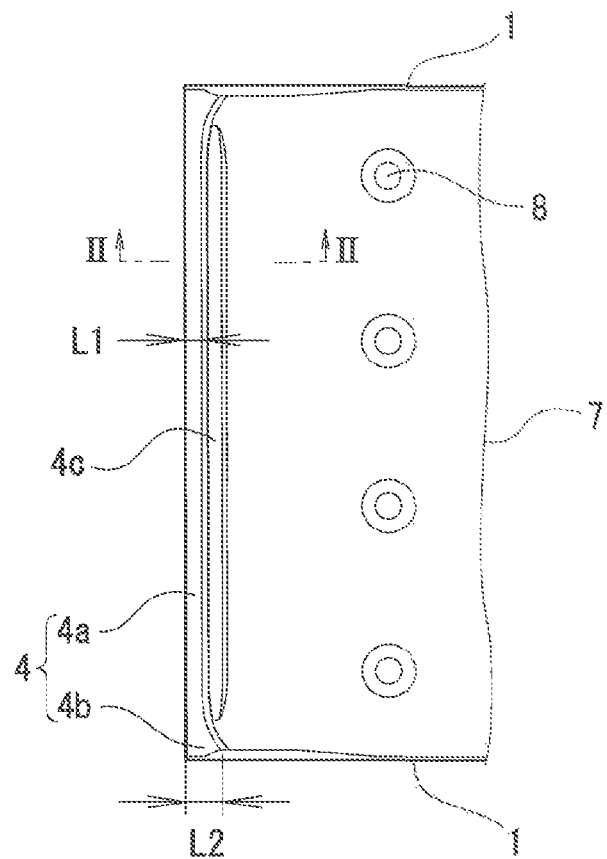
FIG. 1 is a principal part plan view of a heat exchanger core of the present invention.
Figure 2:
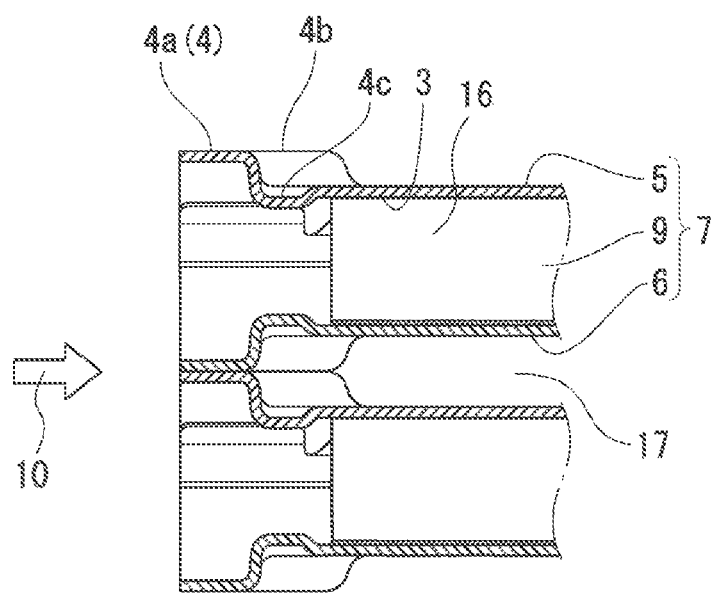
FIG. 2 is an II-II arrow-seen cross-sectional view in FIG. 1.
Figure 3A:
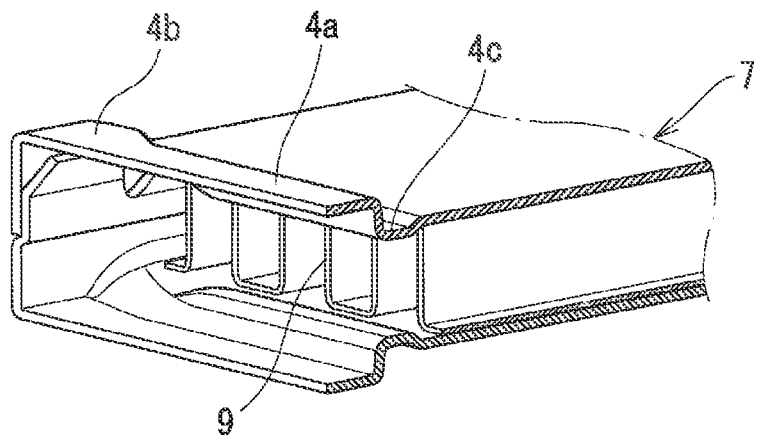
FIGS. 3A and 3B show a principal part perspective view (FIG. 3A) of a flat tube 7 for use in the heat exchanger core, and a principal part vertical section perspective view (FIG. 3B) of a heat exchanger core 15 composed of a stacked body of the flat tubes 7.
Figure 3B:
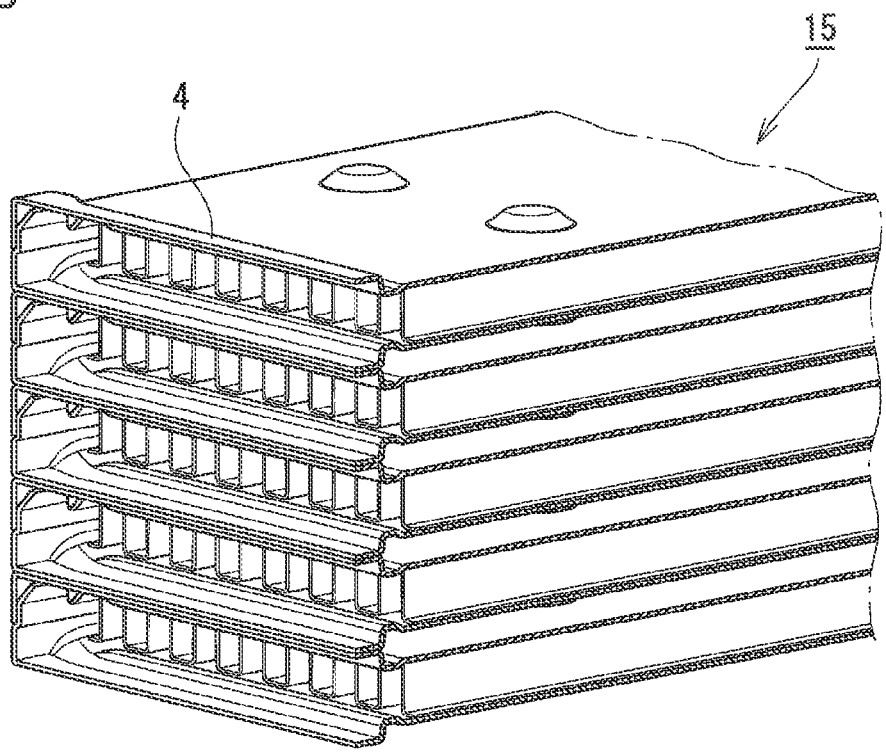

The characteristic of the present invention here is the shape of the swelling portion 4 shown in FIG. 1, FIG. 2.

The swelling portion 4 is swelled in the thickness direction on open sides of the plate 5, plate 6.

In this example, the swelling portion 4 is formed so that the width thereof is wider at both end portions and is narrower in another place, in FIG. 1. In other words, in the intermediate portion, a width narrow portion 4a has a width L1, and at both end portions, a width wide portion 4b thereof has a width L2. Here, L2>L1. The width wide portion 4b has a shape of a flat triangle or a shape of a curved plane whose width of a portion lying nearer to both sides of the side wall 1 is wider.

Furthermore, in a range of this width narrow portion 4a, a recessed groove portion 4c is formed in parallel to the width narrow portion 4a. As shown in FIG. 2, this recessed groove portion 4c is formed on the outer face sides of plate 5, plate 6, and is recessed with a narrow width. In addition, the recessed groove portion 4c is formed in parallel to the width narrow portion 4a and in the approximately same length thereof.

Meanwhile, in this example, as shown in FIG. 1, FIG. 2, the length of the recessed groove portion 4c is formed to be the approximately same length as the length of the width narrow portion 4a, but, instead, it may also be capable to form the recessed groove portion 4c along the swelling portion 4, and to make the length of the recessed groove portion 4c the same as the total length of the swelling portion 4.

When seen from the inner face side of each of plate 5, plate 6, the recessed portion 4c is formed in an elongated projection. This recessed groove portion 4c may also be used for positioning of an inner fin.

Then, each of flat tubes 7 is stacked at the swelling portion 4 and, on the inner face side of the flat tube 7, a gas channel 16 into which the exhaust gas (first fluid) 10 flows is formed. In the gas channel 16, the inner fin 9 is internally mounted.

Moreover, the water channel 17 is formed on the outer face side of the flat tube 7 and the cooling water (second fluid) 11 is supplied thereto. On the water channel 17 side, the recessed groove portion 4c works as a guide channel of the cooling water (second fluid) 11. That is, through the recessed groove portion 4c, the cooling water (second fluid) 11 can be guided more smoothly to the width narrow portion 4a, to cool effectively the apical portion of the flat tube.

(Action)

In the heat exchanger as described above, the exhaust gas (first fluid) 10 flows through the open end on an inlet side of each flat tube 7 into the inside thereof. On the outer face side of the flat tube 7, the cooling water (second fluid) 11 having flowed from the pipe 14 on one side is supplied to each flat tube 7.

On the outer face side of each of plates 5, 6 composing the flat tube 7, the recessed groove portion 4c that is recessed inward and has narrow width is formed in parallel to and in the approximately same length as the width narrow portion 4a, and therefore the flow rate of the cooling water (second fluid) 11 flowing near the width narrow portion 4a on the outer face side of the flat tube 7, that is, in the recessed groove portion 4c increases.

Moreover, with the formation of the recessed groove portion 4c, a crossing angle on the outer face side of the stacking part of the flat tube 7 is expanded, and therefore the flow rate of the cooling water (second fluid) 11 near the width narrow portion 4a increases. As the result of these, cooling of the apical portion of the flat tube 7 is promoted to suppress temperature rise at the apical portion, and therefore degradation of the heat exchanger due to a heat cycle is prevented.

Furthermore, since the recessed groove portion 4c functions as a reinforcing rib against bending in the longitudinal direction of the width narrow portion 4a, it becomes capable to reduce the width of the width narrow portion 4a, and as the result, distance from the cooling water to the front edge of the flat tube 7 becomes shorter. This also promotes cooling of the apical portion to suppress temperature rise at the apical portion, and therefore degradation of the heat exchanger due to a heat cycle is prevented.

Moreover, the recessed groove portion 4c functions as a component of elastic deformation for expansion and contraction in the axis direction of the flat tube 7 to absorb difference in thermal expansion in the direction, and therefore degradation of the heat exchanger due to a heat cycle is also prevented.

Numerical analysis was performed about one example in order to confirm the effect of the present invention, in which the maximum value of apical portion temperature of the flat tube of the conventional type heat exchanger core shown in FIG. 5, FIG. 6, FIGS. 7A and 7B was 358° C. and, in contrast, the maximum value of apical portion temperature of the flat tube of the heat exchanger core of the present invention was 265° C. Thus a remarkable temperature fall effect was confirmed.

INDUSTRIAL APPLICABILITY

The present invention is optimal for EGR coolers, and is also applicable to other heat exchangers such as exhaust heat recovering devices.

REFERENCE SIGNS LIST

1: side wall
3: groove bottom
4: swelling portion
4a: width narrow portion
4b: width wide portion
4c: recessed groove portion
5: plate
6: plate
7: flat tube
8: dimple
9: inner fin
10: first fluid (exhaust gas)
11: second fluid (cooling water)
12: casing
12a: casing main body
12b: lid
13: pipe
14: pipe
15: heat exchanger core
15a: heat exchanger core
16: gas channel
16a: flat tube
16b: swelling portion
17: water channel

The invention claimed is:
1. A header plateless type heat exchanger, the heat exchanger comprising a plurality of flat tubes, each of the flat tubes comprising a pair of plates, each of the plates including a pair of mutually opposed, upright, lengthwise side walls, each respective one of the side walls being situated on a respective side of the plate, each of the plates having a portion in which the plate is deformed in a direction parallel to and away from the side walls, the pair of plates being fitted together while facing each other to form a respective one of the flat tubes, the deformed portions of the pair of plates forming an expanded portion of the flat tube, and end edges of the expanded portion of the flat tube comprising a mouth of the flat tube;
   a heat exchanger core in which a plurality of the flat tubes are stacked upon each other and are brazed and joined to each other at the expanded portions of the flat tubes;
   a casing in which the heat exchanger core is contained,
   the casing having an inlet configured for a heated gas to flow into the casing in proximity to the mouth of the flat tube and in a direction parallel to a lengthwise axis of the flat tube and an outlet remote from the inlet for conducting the gas out of the casing, and
   the casing having an inlet configured for a cooling liquid to flow into the casing in proximity to the mouth of the flat tube and in a direction orthogonal to the lengthwise axis of the flat tube and an outlet remote from the inlet for conducting the liquid out of the casing,
   wherein
   a recessed groove portion that is recessed inward is formed, extending across, in a direction orthogonal to faces of the side walls and parallel to the direction of flow of the cooling liquid into the casing, only on a face of each of the plates perpendicular to the side walls which forms a respective outer face of a respective one of the flat tubes, the recessed groove portion is proximate to the expanded portion and parallel to a length of the expanded portion in the direction orthogonal to the faces of the side walls, the face of the plate across which the recessed grooved portion is formed comprises surfaces of the recessed groove portion, and a projecting part that is inverse to the recessed groove portion is formed across, in a direction orthogonal to the faces of the side walls, only on a face of each of the plates perpendicular to the side walls which forms a respective inner face of a respective one of the tubes, and
   the heat exchanger is configured so that the heated gas flows from the mouth of each of the flat tubes into the inside thereof and the cooling liquid circulates on the outside thereof, including through the recessed groove portion.
2. The header plateless type heat exchanger according to claim 1, wherein a width, in a direction parallel to a length direction of the side walls, of the expanded portion of each of the flat tubes is, at both end portions of the expanded portion in a direction of the expanded portion orthogonal to the faces of the side walls, greater than the width between the end portions, and, each of the end portions of the expanded portion is configured as a flat triangle or a curved shape, and portions of the flat triangle or curved shape lying nearer to the side wall than other portions of the flat triangle or curved shape are wider, than the other portions of the flat triangle or curved shape.

* * * * *